(12) United States Patent
Tanaka et al.

(10) Patent No.: US 11,382,430 B2
(45) Date of Patent: Jul. 12, 2022

(54) HEATER DEVICE

(71) Applicant: DENSO CORPORATION, Kariya (JP)

(72) Inventors: Yusuke Tanaka, Kariya (JP); Kimitake Ishikawa, Kariya (JP); Hiroyasu Oide, Kariya (JP); Hideki Seki, Kariya (JP)

(73) Assignee: DENSO CORPORATION, Kariya (JP)

( * ) Notice: Subject to any disclaimer, the term of this patent is extended or adjusted under 35 U.S.C. 154(b) by 452 days.

(21) Appl. No.: 16/509,637

(22) Filed: Jul. 12, 2019

(65) Prior Publication Data

US 2019/0335907 A1     Nov. 7, 2019

Related U.S. Application Data

(63) Continuation of application No. PCT/JP2017/047110, filed on Dec. 27, 2017.

(30) Foreign Application Priority Data

Feb. 8, 2017    (JP) ............................. JP2017-021457

(51) Int. Cl.
| | |
|---|---|
| *A47C 7/74* | (2006.01) |
| *F24H 3/02* | (2022.01) |
| *B60N 2/56* | (2006.01) |
| *F24H 9/00* | (2022.01) |
| *F24H 9/02* | (2006.01) |
| *F24H 9/06* | (2006.01) |

(52) U.S. Cl.
CPC ............ *A47C 7/748* (2013.01); *B60N 2/5621* (2013.01); *F24H 3/022* (2013.01); *F24H 9/0073* (2013.01); *F24H 9/02* (2013.01); *F24H 9/06* (2013.01)

(58) Field of Classification Search
CPC combination set(s) only.
See application file for complete search history.

(56) References Cited

U.S. PATENT DOCUMENTS

| | | | |
|---|---|---|---|
| 7,354,019 B2 * | 4/2008 | Bauer ..................... | B60N 2/68 244/118.6 |
| 2006/0214479 A1 * | 9/2006 | Dwire .................... | B60N 3/004 297/163 |
| 2011/0163576 A1 | 7/2011 | Akai et al. | |
| 2015/0110477 A1 | 4/2015 | Ota et al. | |

(Continued)

FOREIGN PATENT DOCUMENTS

| | | | | |
|---|---|---|---|---|
| CN | 101902936 | 12/2010 | | |
| CN | 101902936 A | * 12/2010 | ............ | B60N 2/757 |

(Continued)

*Primary Examiner* — Steven S Anderson, II
(74) *Attorney, Agent, or Firm* — Harness, Dickey & Pierce, P.L.C.

(57) ABSTRACT

A heater device for warming a user has a heater panel including a planar heating element which generates heat by energization, a first heat radiation surface formed on one surface side of the heating element, and a second heat radiation surface formed on the other surface side of the heating element. The temperature of the first heat radiation surface is higher than the temperature of the second heat radiation surface. In the heater panel, the first heat radiation surface is configured as a non-contact heater that warms the user in a non-contact manner, and the second heat radiation surface is configured as a contact heater that warms the user in a contact manner.

10 Claims, 5 Drawing Sheets

(56) References Cited

U.S. PATENT DOCUMENTS

| | | | |
|---|---|---|---|
| 2017/0072821 A1 | 3/2017 | Oh et al. | |
| 2017/0305354 A1* | 10/2017 | Kang | ................ B60R 11/02 |
| 2018/0117987 A1 | 5/2018 | Yamaoka et al. | |

FOREIGN PATENT DOCUMENTS

| | | | |
|---|---|---|---|
| JP | 01-150034 | * | 10/1989 |
| JP | H06051918 U | | 7/1994 |
| JP | H09329341 A | | 12/1997 |
| JP | 2011246093 A | | 12/2011 |
| JP | 2013241040 A | | 12/2013 |
| JP | 2014003000 A | | 1/2014 |
| KR | 101673807 B1 | | 11/2016 |
| WO | WO-2016158472 A1 | | 10/2016 |

* cited by examiner

RIGHT ⟵⟶ LEFT

US 11,382,430 B2

HEATER DEVICE

CROSS REFERENCE TO RELATED APPLICATIONS

This application is a continuation application of International Patent Application No. PCT/JP2017/047110 filed on Dec. 27, 2017, which designated the United States and based on and claims the benefits of priority of Japanese Patent Application No. 2017-021457 filed on Feb. 8, 2017. The entire disclosure of all of the above applications is incorporated herein by reference.

TECHNICAL FIELD

The present disclosure relates to a heater device.

BACKGROUND

A vehicle heater device is mounted on a vehicle.

SUMMARY

The present disclosure aims to make the user warm by using a heat quantity of a heating element more efficiently.

According to one aspect of the present disclosure, a heater device for warming a user has a heater panel that includes a planar heating element that generates heat when energized, a first heat radiation surface formed on one surface side of the heating element, and a second heat radiation surface formed on the other surface side of the heating element. The temperature of the first heat radiation surface is higher than the temperature of the second heat radiation surface. In the heater panel, the first heat radiation surface is configured as a non-contact heater that warms the user in a non-contact manner, and the second heat radiation surface is configured as a contact heater that warms the user in a contact manner.

DETAILED DESCRIPTION

Figure 1:
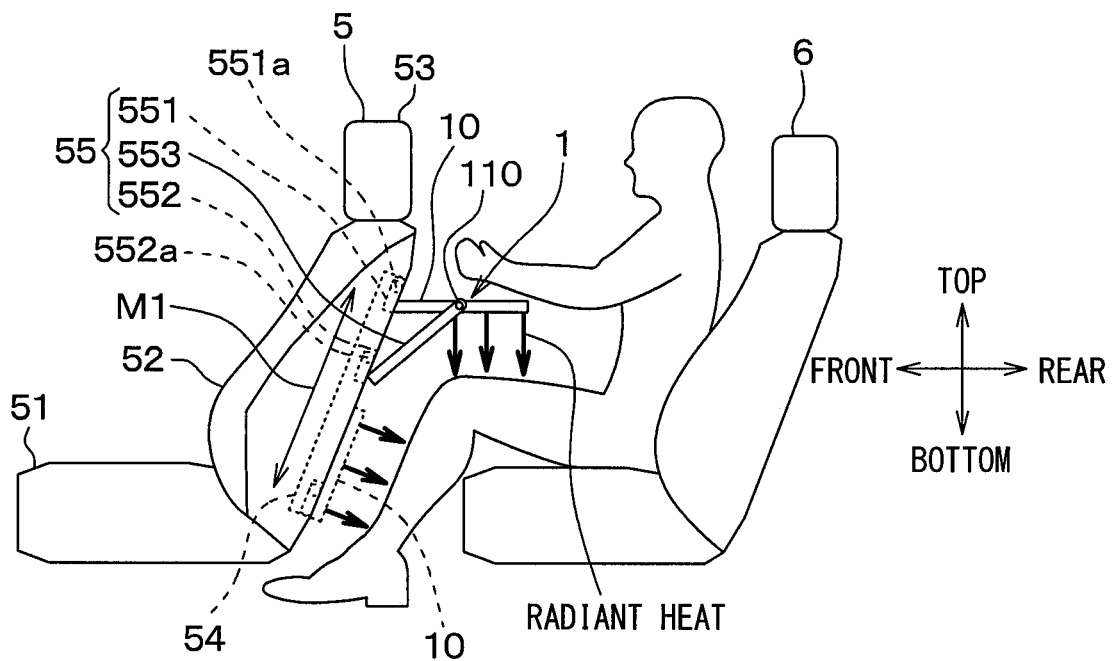
FIG. 1 is a diagram showing a state in which a heater device according to a first embodiment is mounted on a vehicle.

Hereinafter, embodiments of the present disclosure will be described with reference to the drawings. In the following embodiments, parts, which are the same as or equivalent to those described in the preceding embodiment(s), will be indicated by the same reference signs, and the description thereof may be omitted. Also, in the following embodiments, when only some of the constituent elements are described, corresponding constituent elements of a previously described one or more of the embodiments may be applied to the rest of the constituent elements. The following embodiments may be partially combined with each other even if such a combination is not explicitly described as long as there is no disadvantage with respect to such a combination.

First Embodiment

A heater device according to a first embodiment will be described with reference to FIGS. 1 and 2. Hereinafter, the arrows indicating top and bottom, front and rear, left and right in each drawing indicate the direction in a state where the heater device is mounted on the vehicle. The heater device 1 is mounted on a vehicle and radiates radiant heat to warm the user seated on a seat 6 of the vehicle. The heater device 1 of the present embodiment includes a heater panel 10. The heater panel 10 is provided on a back surface of a front seat 5 with respect to the seat 6 so as to function as a table used by a user seated on the seat 6.

The front seat 5 includes a seat cushion 51, a seatback 52, and a headrest 53. The seat cushion 51 supports the user's thigh and buttocks. The seatback 52 supports the user's back. The seat cushion 51 and the seatback 52 are constituted by seat pads which are elastically deformed. This seat pad is made of an elastic member such as urethane foam.

A plurality of slide rails 54 are embedded in a back surface of the seatback 52 of the front seat 5 so as to move in the top and bottom direction the heater panel 10 along a back surface of the seatback 52 as indicated by arrow M1. Each slide rail 54 has a groove portion. Each slide rail 54 is disposed in parallel with a predetermined space therebetween.

A heater panel 10 functioning as a table is attached to each slide rail 54 via a tilting mechanism 55.

Figure 2:
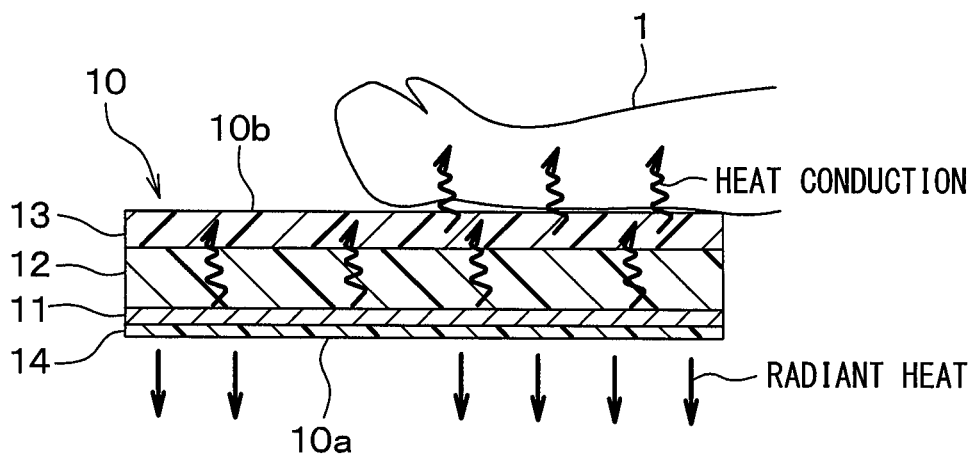
FIG. 2 is a cross-sectional view of the heater device of the first embodiment.

In FIG. 1, the heater panel 10 functions as a table by sliding the heater panel 10 to the upper limit position of the movable range of each slide rail 54. The state of the heater panel 10 is indicated by a solid line. In addition, the heater panel 10 is stored between the slide rails 54 by sliding the heater panel 10 to the lower limit position of the movable range of each slide rail 54. The state of the heater panel 10 is indicated by a dotted line.

Here, in the state where the heater panel 10 is stored, an end portion positioned on the upper portion of the heater panel 10 is referred to as an upper end portion, an end portion located on the side portion of the heater panel 10 is referred to as a side end portion, and an end portion located at the lower portion of the heater panel 10 is referred to as a lower end portion.

The tilting mechanism 55 has sliders 551 and 552 and an elongated support member 553. The sliders 551 and 552 are slidably fitted in the groove portions of the slide rail 54, respectively.

The slider 551 has a rotation shaft 551a extending in the left and right direction of the vehicle, and is connected to the upper end portion of the heater panel 10 via the rotation shaft 551a. The slider 551 rotatably supports the heater panel 10 around the axis of the rotation shaft 551a. The slider 552 has a rotation shaft 552a extending in the left and right direction of the vehicle.

A rotation shaft 110 is provided at the center of the side end portion of the heater panel 10. The support member 553 is provided between the rotation shaft 552a of the slider 552 and the rotation shaft 110 of the heater panel 10.

The user can freely change the position in the top and bottom direction of the heater panel 10 by sliding the heater panel 10 between the lower limit position and the upper limit position that is a movable range of each slide rail 54. In addition, the user can freely change an angle of the heater panel 10 with respect to each slide rail 54. It is possible to use the heater panel 10 as a table by changing the angle of the heater panel 10 with respect to each slide rail 54 so that a first and a second heat radiation surfaces 10a, 10b of the heater panel 10 are horizontal.

Next, the configuration of the heater panel 10 will be described. As shown in FIG. 2, the heater panel 10 includes a heating element 11, a heat insulating material 12, a top plate 13, and a skin member 14. In the heater panel 10, these members 11 to 14 are integrated by laminating the skin member 14, the heating element 11, the heat insulating material 12, and the top plate 13 in this order.

The heating element 11 is constituted by a conductive member having a planar shape, and generates heat upon energization to radiate radiant heat. Current is supplied to the heating element 11 from a battery (not shown) via a connecting wire.

The skin member 14 is disposed so as to cover one surface side of the heating element 11. The skin member 14 is made of a member that can withstand high temperatures and has less temperature decrease due to heat conduction, such as a knitted fabric, a woven fabric, a nonwoven fabric, or the like. One surface of the skin member 14 is adhered to one surface of the heat insulating material 12 and the other surface of the skin member 14 constitutes a first heat radiation surface 10a of the heater panel 10.

The heat insulating material 12 is disposed on the other surface side of the heating element 11. The heat insulating material 12 has high heat insulating properties and high heat resistance, and suppresses heat transfer from the heating element 11.

The top plate 13 is in the form of a plate and is adhered to the opposite surface side opposite to the surface on the heating element 11 side of the heat insulating material 12. The top plate 13 is made of resin, for example.

The heater panel 10 according to the present embodiment has a first heat radiation surface 10a formed on one surface side of the heating element 11 and a second heat radiation surface 10b formed on the other surface side of the heating element 11. The first heat radiation surface 10a is constituted by an opposite surface opposite to the heating element 11 side of the skin member 14. The second heat radiation surface 10b is formed by an opposite surface opposite to the surface on the side of the heat insulating material 12 of the top plate 13.

In the heater panel 10 of the present embodiment, the temperature of the first heat radiation surface 10a is higher than the temperature of the second heat radiation surface 10b. For example, the heater panel 10 is set so that the temperature of the first heat radiation surface 10a is 80 to 100° C., and the temperature of the second heat radiation surface 10b is 35 to 45° C.

In the heater panel 10 of the present embodiment, the first heat radiation surface 10a is configured as a non-contact heater that warms the user without contacting the user, and the second heat radiation surface 10b is configured as a contact heater that warms the user to heat the user with contacting the user.

That is, on the side of the first heat radiation surface 10a, the heater panel 10 warms the user by radiant heat radiated from the first heat radiation surface 10a. On the side of the second heat radiation surface 10b, the user's body is warmed by heat conduction from the second heat radiation surface 10b.

Next, the operation of the heater device will be described. Here, as indicated by the solid line in FIG. 1, it is assumed that the heater panel 10 is in a state of functioning as a table at the upper limit position of the movable range of each slide rail 54. Further, it is assumed that the user places the arm on the second heat radiation surface 10b of the heater panel 10.

When energization to the heating element 11 is started in response to operation of an operation portion (not shown), the heating element 11 generates heat. Radiant heat is radiated from the first heat radiation surface 10a toward the lower body of the user seated on the seat 6, particularly toward from a kneecap to an upper thigh by the heat of the heating element 11. Further, the heat of the heating element 11 is transferred to an arm of the human body of the user in contact with the second heat radiation surface 10b. In this way, the heater panel 10 warms the user's body on both the first heat radiation surface 10a and the second heat radiation surface 10b.

The heater panel 10 may change the position in the top and bottom direction along the back of the seatback 52, and it is also possible to change the angle of the heater panel 10 with respect to each slide rail 54.

Therefore, by moving the heater panel 10 downward along the back of the seatback 52, it is possible to intensively warm from the foot to shank of the human body, and by moving the heater panel 10 to the knee position of the human body, it is possible to intensively warm the kneecap.

According to the above configuration, the heater device includes a planar heating element 11 that generates heat when energized, and the heater panel 10 including the first heat radiation surface 10a formed on one surface side of the heating element 11, and the second heat radiation surface 10b formed on the other surface side of the heating element 11. The temperature of the first heat radiation surface 10a is higher than the temperature of the second heat radiation surface 10b. In the heater panel 10, the first heat radiation surface 10a is configured as a non-contact heater that warms the user in a non-contact manner, and the second heat radiation surface 10b is configured as a contact heater that warms the user in the contact manner.

According to such a configuration, the temperature of the first heat radiation surface 10a is higher than the temperature of the second heat radiation surface 10b. In the heater panel 10, the first heat radiation surface 10a is configured as a non-contact heater that warms the user in a non-contact manner, and the second heat radiation surface 10b is configured as a contact heater that warms the user in the contact manner. Therefore, it is possible to warm the user by more efficiently using the heat quantity of the heating element.

Further, the heater panel 10 has a plate member 13 disposed on the second heat radiation surface 10b side of the heating element 11. The second heat radiation surface 10b is formed by an opposite surface opposite to the heating element 11 side of the plate member 13. In this manner, the second heat radiation surface 10b can be constituted by the opposite surface to the heating element 11 side of the plate member 13.

Further, in the heater panel 10, the first heat radiation surface 10a radiates radiant heat toward the lower body of the user seated on the seat 6. At the same time, the second heat radiation surface 10b is disposed at a position that functions as a table used by a user seated on the seat 6. The plate member 13 is configured as a top plate of the table.

According to this configuration, the heater panel 10 can have the functions as a double-sided heater and as a table.

The heater device is disposed on the rear surface of the seatback 52 of the front seat 5 provided in the front seat of the seat 6 and has a slide rail 54 for moving in the top and bottom direction the heater panel 10 along the back surface of the seatback 52.

According to this configuration, the heater panel 10 can be moved in the top and bottom direction along the back surface of the seatback 52, and the heater panel 10 can be moved to the position desired by the user.

Second Embodiment

Figure 3:
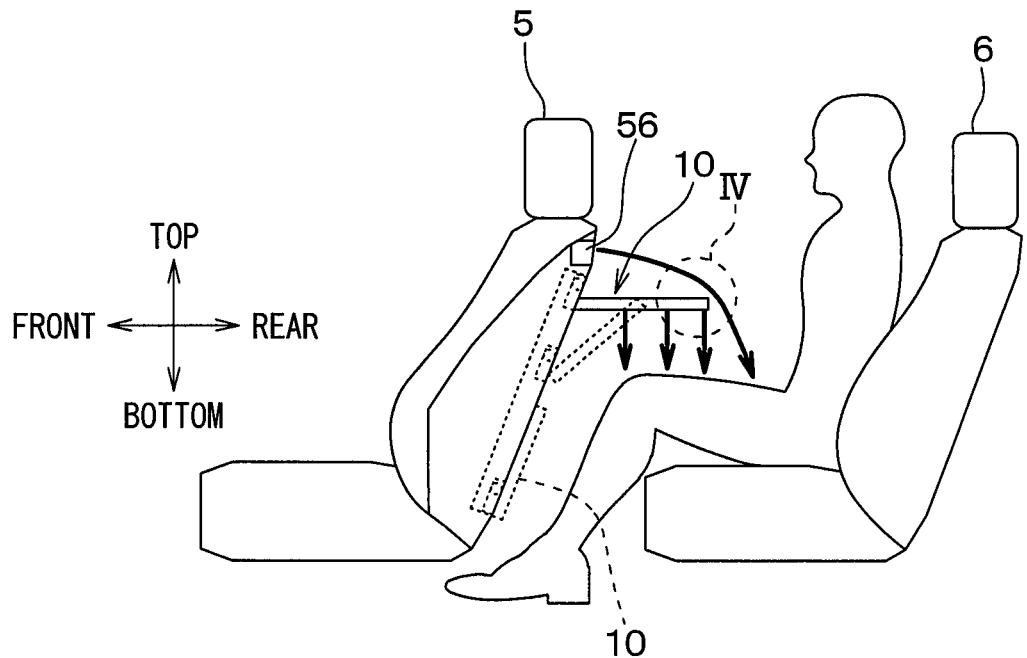
FIG. 3 is a diagram showing a state in which a heater device according to a second embodiment is mounted on a vehicle.

A heater device according to the second embodiment will be described with reference to FIGS. 3 and 4. In comparison with the heater device of the first embodiment, the heater device of the present embodiment further includes a blowout port 56 that blows the temperature-adjusted and conditioned air to the back surface of the front seat 5. In addition, in the heater panel 10, the corner portion on the side of the seat 6 and on the side of the second heat radiation surface 10b has a rounded shape.

The blowout port 56 is arranged above the upper limit position of the movable range of the heater panel on the back surface of the front seat 5. Air conditioned air whose temperature has been adjusted through a duct from an air conditioner (not shown) is introduced into the blowout port 56. The blowout port 56 is blown toward the heater panel 10 arranged at a position used as a table. Specifically, the blowout port 56 blows out the temperature-adjusted and conditioned air toward the second heat radiation surface 10b of the heater panel 10.

Figure 4:
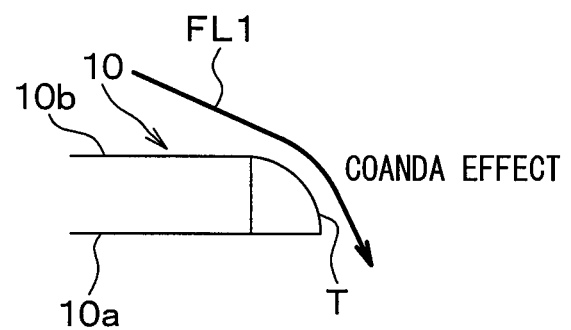
FIG. 4 is a view showing a flow of conditioned air flowing toward the heater panel according to the second embodiment.

As shown in FIG. 4, since in the heater panel 10, the corner portion on the side of the seat 6 and on the side of the second heat radiation surface 10b has a rounded shape, the conditioned air blown out from the blowout port 56 flows toward the base of the user's thigh due to the Coanda effect. Specifically, the conditioned air blown out from the blowout port 56, as indicated by an arrow FL1, is directed to the corner portion on the side of the second heat radiation surface 10b at the end portion T on the seat 6 side of the heater panel 10, and then it turns around the corner and flows toward the base of the user's thigh.

As described above, the heater device has the blowout port 56. The blowout port 56 is disposed above the upper limit position of the movable range of the heater panel 10 on the back surface of the seatback 52 of the front seat 5, and the temperature-adjusted and conditioned air is directed to the second heat radiation surface of the heater panel through the blowout port 56. Further, in the heater panel 10, the corner portion on the side of the seat 6 and on the side of the second heat radiation surface 10b has a rounded shape.

According to this configuration, the conditioned air blown out from the blowout port 56 flows toward the base of the user's thigh due to the Coanda effect. Therefore, the base of the thigh of the user, which is difficult to sufficiently warm by the first heat radiation surface 10a of the heater panel 10, can be warmed by the conditioned air.

Third Embodiment

Figure 5:
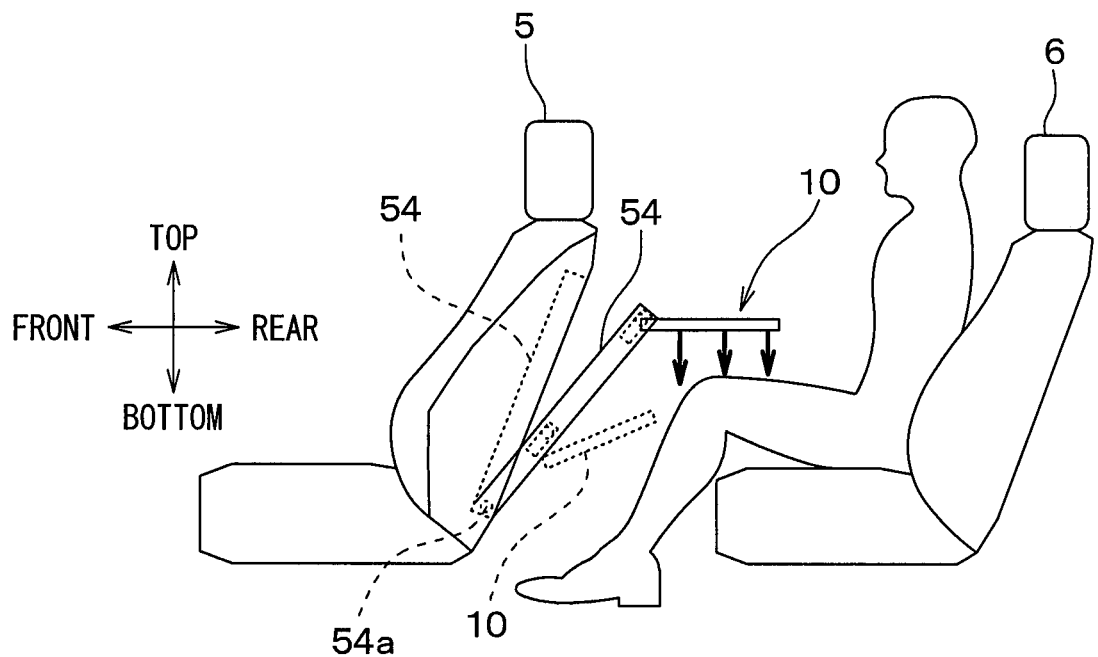
FIG. 5 is a view showing a state in which the slide rail is folded down to the seat side in the heater device according to a third embodiment.

A heater device according to the third embodiment will be described with reference to FIG. 5. In the first embodiment, the plurality of slide rails 54 are embedded in the back surface of the seatback 52 of the front seat 5. On the other hand, the heater device according to the present embodiment is provided with a rotation mechanism 54a that rotatably supports the end portion on lower end of the slide rail 54 on the front seat 5. The end of the slide rail 54 on the upper end side is movable to the seat 6 side by the rotation mechanism 54a.

As a result, it is possible to warm the user by tilting the upper end portion of the slide rail 54 to the seat 6 side, and by bring the heater panel 10 close to the user side of the seat 6.

Fourth Embodiment

Figure 6:
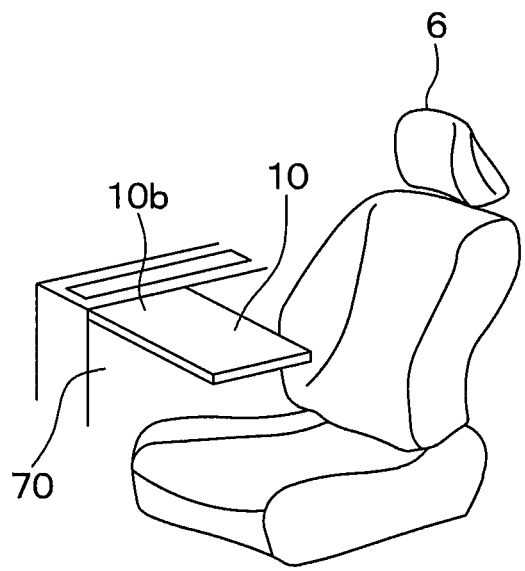
FIG. 6 is a diagram showing a state in which the heater device according to a fourth embodiment is provided in the interior of a vehicle.

A heater device according to the fourth embodiment will be described with reference to FIG. 6. The heater panel 10 of the first embodiment is provided on the back of the seatback 52 of the front seat 5. On the other hand, the heater panel 10 of the present embodiment is provided in the interior 70 existing on one side of the seat 6 in the right and left direction of the vehicle.

The heater panel 10 of the present embodiment is provided on the interior 70 so as to function as a table used by a user seated on the seat 6. In this manner, the heater panel 10 functioning as a table can be provided in the interior 70.

Fifth Embodiment

Figure 7:
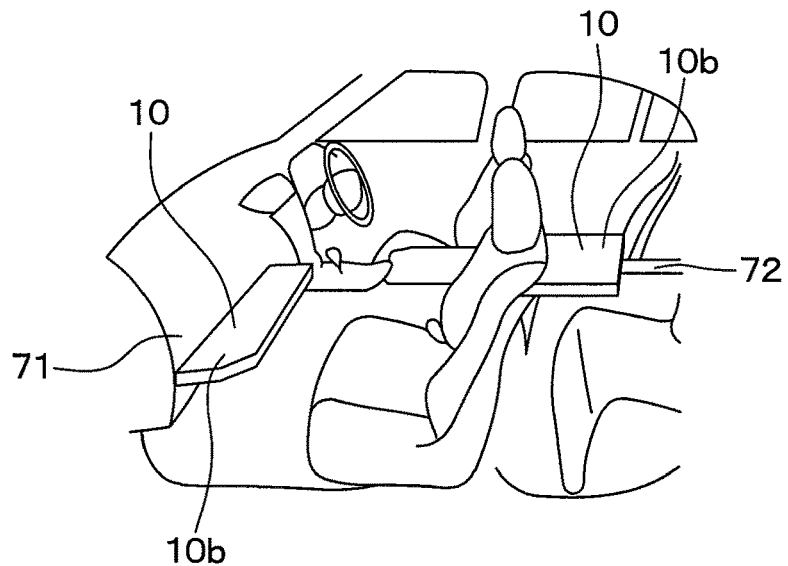
FIG. 7 is a view showing a state in which the heater devices are provided on a dashboard disposed in a front portion of a passenger compartment on a center console of a rear seat of a vehicle as a post-fitting part in the heater device according to a fifth embodiment.

A heater device according to the fifth embodiment will be described with reference to FIG. 7. The heater panel 10 of the present embodiment is provided on a dashboard 71 disposed in the front of the passenger compartment and on a center console 72 in the rear seat of the vehicle as a retrofit part.

In the heater panel 10 provided on the dashboard 71, the first heat radiation surface 10a is arranged on the lower surface, and the lower body of the user of the passenger seat is warmed by the first heat radiation surface 10a in the non-contact manner. At the same time, the heater panel 10 has the second heat radiation surface 10b disposed on the upper surface, and the second heat radiation surface 10b warms the user of the passenger seat in the contact manner.

The heater panel 10 provided on the center console 72 in the rear seat of the vehicle is provided so as to project from the center console 72 to the upper side of the lower body of the users on the left and right rear seat.

The heater panel 10 provided in the center console 72 in the rear seat of the vehicle has a first heat radiation surface 10a on the lower surface thereof and warms the lower body of the user on the rear seat in the non-contact manner by the first heat radiation surface 10a. At the same time, the heater panel 10 has the second heat radiation surface 10b arranged on the upper surface, and the second heat radiation surface 10b warms the user on the rear seat in the contact manner.

In this manner, the heater panel 10 can also be provided on the dashboard 71, the center console 72, or the like as a retrofit part.

Sixth Embodiment

Figure 8:
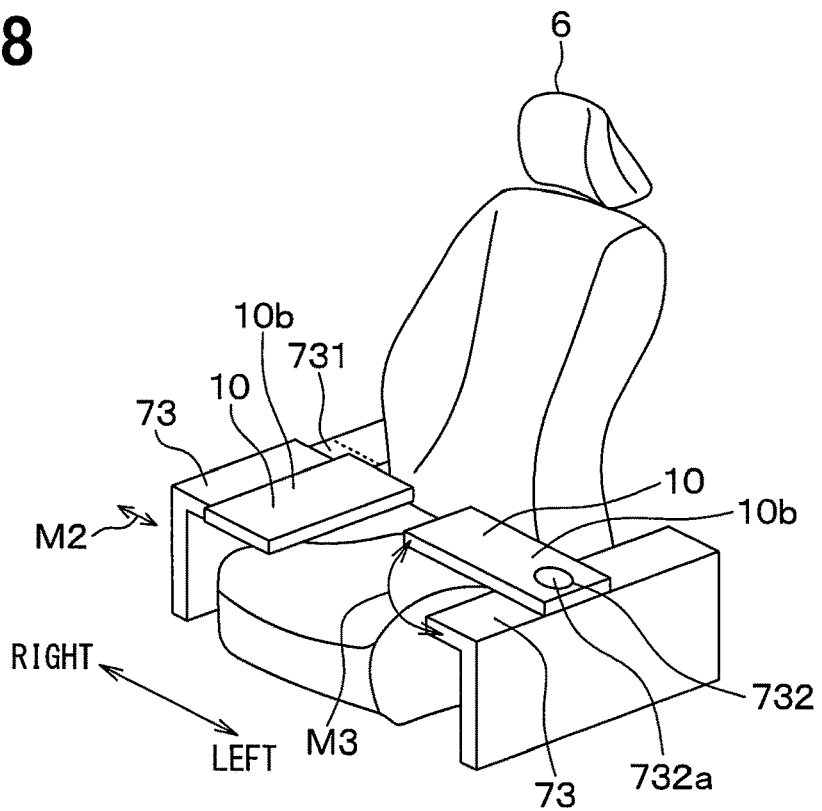
FIG. 8 is a diagram showing a state in which a heater device according to a second embodiment is mounted on a vehicle.
Figure 9:
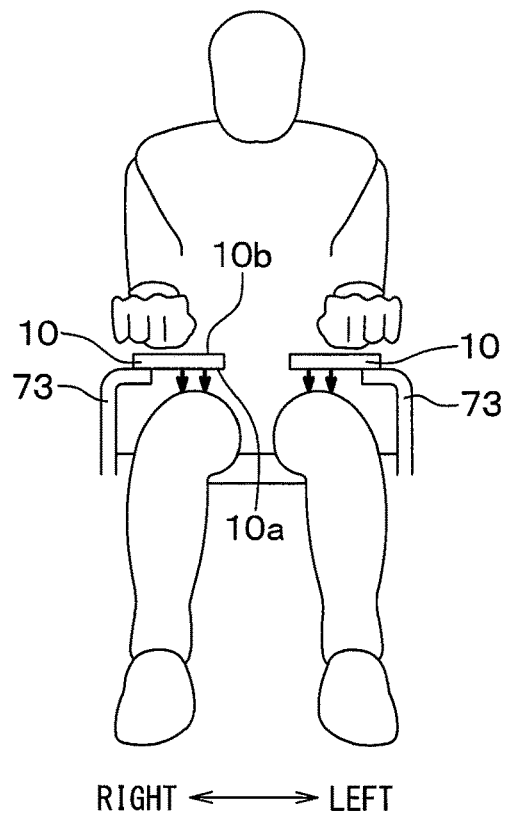
FIG. 9 is a view showing a state where a user uses a heater panel as an armrest in the heater device of the sixth embodiment.

A heater device according to the sixth embodiment will be described with reference to FIGS. 8 and 9. As shown in FIGS. 8 to 9, the heater panel 10 according to the present embodiment is configured to function as an armrest so that the user seated on the seat 6 places arm. The heater panel 10 is supported by support portions 73 provided on the left and right sides of the seat 6.

In the heater panel 10 according to the present embodiment, the first heat radiation surface 10a radiates radiant heat toward the lower body of the user seated on the seat 6. At the same time, the second heat radiation surface 10b is disposed at a position that functions as an armrest for placing the arm of the user seated on the seat 6, and the plate member 13 is configured as a top plate of the armrest.

Therefore, the heater panel 10 can have functions as both-side heaters and as armrests.

The heater panel 10 provided on the right side of the seat 6 has a moving mechanism 731 that moves with respect to the support portion 73. The moving mechanism 731 reciprocally moves the heater panel 10 along the rails. The heater panel 10 provided on the right side of the seat 6 slides in the left and right direction of the vehicle by the moving mechanism 731 as indicated by arrow M2.

The heater panel 10 provided on the right side of the seat 6 has a moving mechanism 732 that moves with respect to the support portion 73. The moving mechanism 732 rotates the heater panel 10 around the rotation shaft 732a. The heater panel 10 provided on the right side of the seat 6 is rotated around the rotation shaft 732a by the moving mechanism 732 as indicated by an arrow M3.

That is, the heater device has moving mechanisms 731, 732 for moving the heater panel 10 between the first position and the second position. In the second position, as shown in FIG. 9, the first heat radiation surface 10a radiates radiant heat toward the lower body of the user seated on the seat 6 and the second heat radiation surface 10b is functioned as the armrest on which the arm of the user seated on the seat 6 is placed.

The first position can be a storage position for storing the heater panel 10, for example, a position at which the heater panel 10 does not prevent the user from sitting on the seat 6.

According to this configuration, the heater panel 10 can be moved between the first position and the second position. In the second position, the first heat radiation surface 10a radiates radiant heat toward the lower body of the user seated on the seat 6 and the second heat radiation surface 10b is functioned as the armrest on which the arm of the user seated on the seat 6 is placed.

Seventh Embodiment

Figure 10:
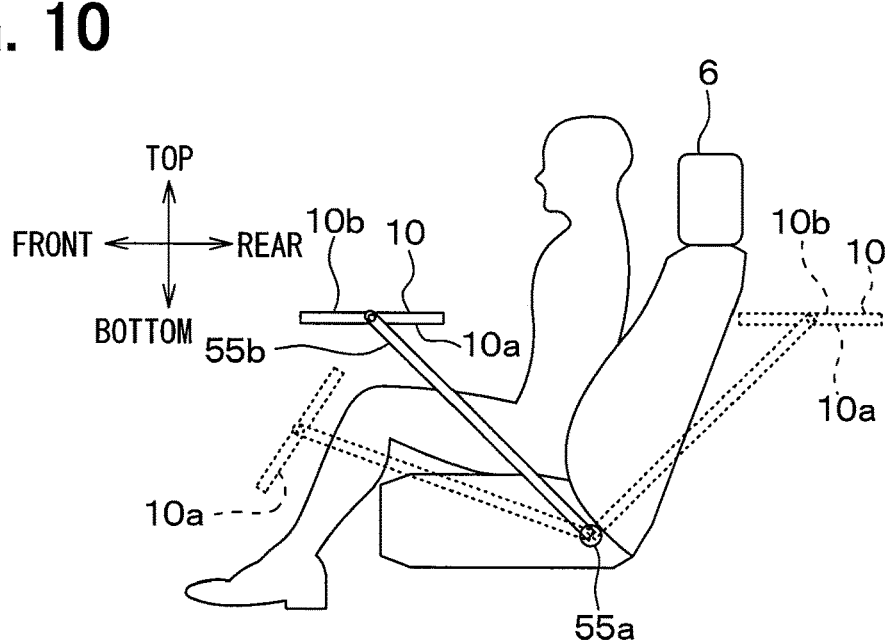
FIG. 10 is a diagram showing a state in which a heater device according to a seventh embodiment is mounted on a vehicle.

A heater device according to the seventh embodiment will be described with reference to FIG. 10. The heater panel 10 of the present embodiment is supported by a support member 55b attached to the side surface of the front seat 5. One end of the support member 55b is rotatably attached to a rotation shaft 55a provided on the side surface of the front seat 5 and the heater panel 10 is attached to the other end of the support member 55b.

The heater panel 10 is rotatably attached to the other end of the support member 55b. Further, the heater panel 10 can adjust the angle with respect to the support member 55b so that the first heat radiation surface 10a is parallel to the plane orthogonal to the left and right direction of the vehicle.

When the user on the front seat 5 uses the heater device, the heater panel 10 is set at a position forward of the front seat 5 so that the second heat radiation surface 10b of the heater panel 10 is horizontal and faces upward. Thereby, the heater panel 10 can function as a table of the user of the front seat 5. The heater panel 10 can be installed near the feet of the user on the front seat 5.

When the user on the rear seat with respect to the front seat 5 uses the heater device, the heater panel 10 is set at a position behind the front seat 5 so that the second heat radiation surface 10b of the heater panel 10 is horizontal and faces upward. Thus, the heater panel 10 can function as a user's table.

Other Embodiments (1) In each of the above-described embodiments, the example in which the heater device is mounted on a vehicle is shown, but it may be mounted on a moving body such as an aircraft, a train, a ship or the like, and installed in a building such as a house, a hospital, a theater or the like.

(2) The heater device of each of the above embodiments has a plate-shaped heating element 11. On the other hand, a low heat conducting portion having a thermal conductivity lower than that of the heat radiating portion is disposed so as to surround the periphery of the plurality of heat radiating portions. A heating element 11 may be provided so as to suppress a temperature rise of a portion in contact with an object when the object touches a specific heat radiation part (see, for example, Japanese Patent Application No. 2014-3000).

(3) Although the heater panel 10 of each of the above embodiments has the heat insulating material 12, the heat insulating material 12 may be omitted, or an air layer may be provided instead of the heat insulating material 12.

The present disclosure is not limited to the above-described embodiments, and can be appropriately modified. The embodiments described above are not independent of each other, and can be appropriately combined except when the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. Furthermore, in each of the above embodiments, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as indispensable or is obviously indispensable in view of the principle of the present disclosure. Furthermore, in each of the above embodiments, in the case where the material, the shape and/or the positional relationship of the constituent element(s) are specified, the present disclosure is not necessarily limited to the material, the shape and/or the positional relationship of the constituent element(s) unless the embodiment specifically states that the material, the shape and/or the positional relationship of the constituent element(s) is/are necessary or is/are obviously essential in principle.

SUMMARY

According to a first aspect shown in part or all of the above embodiments, the heater device is a heater device for warming a user, and includes the planar heating element that generates heat when energized, and the heater panel including a first heat radiation surface formed on the one side of the heating element and a second heat radiation surface formed on the other surface side of the heating element. In addition, the temperature of the first heat radiation surface is higher than the temperature of the second heat radiation surface, and the first heat radiation surface of the heater panel is configured as a non-contact heater that warms the user in a non-contact manner, the second heat radiation surface is configured as a contact heater that warms the user in the contact manner.

According to a second aspect, the heater panel has a plate member disposed on the second heat radiation surface side of the heating element, and the second heat radiation surface is an opposite surface opposite to the heating element side of the plate member. In this manner, the second heat radiation surface can be constituted by the opposite surface to the heating element side of the plate member.

According to the third aspect, the heater panel is positioned in such a manner that the first heat radiation surface radiates radiant heat toward the lower body of the user seated on the seat and the second heat radiation surface is functioned as the table used by the user seated on the seat. And the plate member is configured as a top plate of the table.

According to this configuration, the heater panel can have the functions as a double-sided heater and as a table.

According to a fourth aspect, the heater device is disposed on the rear surface of the seatback of the front seat provided in the front seat of the seat and has a slide rail for moving in the top and bottom direction the heater panel along the back surface of the seatback.

According to this configuration, the heater panel can be moved in the top and bottom direction along the back surface of the seatback, and the heater panel can be moved to the position desired by the user.

According to a fifth aspect, the heater device has the blowout port. The blowout port is disposed above the upper limit position of the movable range of the heater panel on the back surface of the seatback of the front seat, and the temperature-adjusted and conditioned air is directed to the second heat radiation surface of the heater panel through the blowout port. Further, in the heater panel, the corner portion on the side of the seat and on the side of the second heat radiation surface has a rounded shape.

According to this configuration, the conditioned air blown out from the blowout port flows toward the base of the user's thigh due to the Coanda effect. Therefore, the base of the thigh of the user, which is difficult to sufficiently warm by the first heat radiation surface of the heater panel, can be warmed by the conditioned air.

According to a sixth aspect, the heater device further includes a rotation mechanism that rotatably supports the end portion on the lower end side of the slide rail with respect to the front seat, and the end portion on the upper end side of the slide rail can be moved to the seat side by the rotation mechanism.

As a result, it is possible to warm the user by tilting the upper end portion of the slide rail to the seat side, and by bringing the heater panel close to the user side of the seat.

According to a seventh aspect, the heater panel is positioned in such a manner that the first heat radiation surface radiates radiant heat toward the lower body of the user seated on the seat and the second heat radiation surface is functioned as the armrest on which the user seated on the seat places arms. The plate member is configured as a top plate of the armrest.

Therefore, the heater panel can have functions as both-side heaters and as armrests.

Further, according to an eighth aspect, the heater device has a moving mechanism in which the heater panel is moved between a first position and a second position. In the second position, the first heat radiation surface radiates the radiant heat toward the lower body of the user seated on the seat, and the second heat radiation surface functions as an armrest on which the arm of the user seated on the seat is placed.

According to this configuration, the heater panel can be moved between the first position and the second position. In the second position, the first heat radiation surface 10a radiates the radiant heat toward the lower body of the user seated on the seat, and the second heat radiation surface 10b functions as an armrest on which the arm of the user seated on the seat 6 is placed.

According to a ninth aspect, the heater panel is provided with a heat insulating material disposed between the heating element and the second heat radiation surface. According to this configuration, it is possible to optimize the temperature difference between the temperature of the first heat radiation surface and the temperature of the second heat radiation surface with the heat insulating material.

According to a tenth aspect, the heater device is mounted on a movable body. In this manner, the heater device can be configured as a heater mounted on the moving body.

According to study of the inventors, radiant heat radiated from one surface of the electric heating pad is directed to the thigh of the occupant in the rear seat, but radiant heat radiated from the other surface of the electric heating pad will be wasted because it will be blocked by the back of the front seat. So, the present disclosure aims to make the user warm by using a heat quantity of a heating element more efficiently.

According to one aspect of the present disclosure, a heater device for warming a user has a heater panel that includes a planar heating element that generates heat when energized, a first heat radiation surface formed on one surface side of the heating element, and a second heat radiation surface formed on the other surface side of the heating element. The temperature of the first heat radiation surface is higher than the temperature of the second heat radiation surface. In the heater panel, the first heat radiation surface is configured as a non-contact heater that warms the user in a non-contact manner, and the second heat radiation surface is configured as a contact heater that warms the user in a contact manner.

According to such a configuration, the temperature of the first heat radiation surface is higher than the temperature of the second heat radiation surface, and the heater panel is configured such that the first heat radiation surface is configured as a non-contact heater that warms the user in a non-contact manner, and the second heat radiation surface is configured as a contact heater that warms the user in a contact manner, so that the user can be warmed by more efficiently utilizing the heat quantity of the heating element.

The invention claimed is:

1. A heater device for warming a user, comprising
a heater panel including a planar heating element which generates heat by energization, a first heat radiation surface formed on one surface side of the heating element, and a second heat radiation surface formed on the other surface side of the heating element, wherein
the heater panel is provided on and attached to a front seat so as to function as a table used by the user seated on a rear seat,
the heater panel has a plate member disposed on the second heat radiation surface side of the heater panel,
the plate member is configured as a top plate of the table,
the temperature of the first heat radiation surface is higher than the temperature of the second heat radiation surface via the plate member,
in the heater panel, the first heat radiation surface is configured as a non-contact heater that warms the user seated on the rear seat in a non-contact manner, and the second heat radiation surface on the plate member side is configured as a contact heater that warms the user seated on the rear seat in a contact manner, and
the heater panel warms one portion of the rear seat away from the front seat in a stored, lower limit position and warms another portion of the rear seat away from the front seat in an extended, upper limit position.

2. The heater device according to claim 1, wherein
the second heat radiation surface is formed by a surface opposite to the heating element side of the plate member.

3. The heater device according to claim 2, wherein
in the heater panel, the first heat radiation surface radiates radiant heat toward a lower body of the user seated on the seat.

4. The heater device according to claim 3, further comprising,
a slide rail which is disposed on a back surface of a seatback of the front seat of the seats so as to move the heater panel in a top and bottom direction along the back surface of the seatback.

5. The heater device according to claim 4, further comprising,
a blowout port disposed above an upper limit position of the movable range of the heater panel on the back surface of the seatback of the front seat so as to blow out the temperature-adjusted and conditioned air toward the second heat radiation surface of the heater panel, wherein
a corner portion on the second heat radiation surface side at an end portion positioned on the seat side of the heater panel has a rounded shape.

6. The heater device according to claim 4, further comprising,
a rotation mechanism configured to rotatably support an end portion on a lower end side of the slide rail to the front seat, wherein
an end portion on the upper end side of the slide rail is movable toward the seat side by the rotation mechanism.

7. The heater device according to claim 2, wherein
in the heater panel, the first heat radiation surface radiates radiant heat toward a lower body of the user seated on the seat, and the heater panel is arranged such that the second heat radiation surface functions as an armrest on which the user seated on the seat places the user's arm,
the plate member is configured as a top plate of the armrest.

8. The heater device according to claim 7, further comprising,
a moving mechanism configured to move the heater panel between a first position and a second position, wherein
in the second position, the second heat radiation surface radiates the radiant heat toward a lower body of the user seated on the seat, and the second heat radiation surface functions as the armrest on which the arm of the user seated on the seat is placed.

9. The heater device according to claim 1, wherein
the heater panel includes a heat insulating material disposed between the heater element and the second heat radiation surface.

10. The heater device according to claim 1, wherein
the heater device is mounted on a moving body.

* * * * *